United States Patent Office 2,776,278
Patented Jan. 1, 1957

2,776,278

METHOD OF CITRUS OIL PRODUCTION

Jack P. Birds, North Hollywood, Calif., assignor to General Foods Corporation, New York, N. Y., a corporation of Delaware No Drawing. Application April 29, 1953,
Serial No. 352,047

6 Claims. (Cl. 260—236.6)

This invention relates to an improved process for removing citrus oils from the peel of citrus fruits and further to a process which provides an increased yield of such oil.

Citrus oils such as lemon, lime, and orange oils are well known articles of commerce and are widely used as flavoring agents in various food products. These oils are usually recovered from the peel of the fruit by either distillation or by extraction at room temperature under atmospheric conditions. The latter process generally provides products superior in quality to those obtained by distillation and are called "cold-pressed" oils in the trade. It is with the production of these cold-pressed oils that this invention is primarily concerned.

Production of cold-pressed citrus oils is a well known art. One procedure involves removal of the oil-bearing outer portion or flavedo of the citrus fruit by any suitable means, one such means being described in U. S. Patent No. 2,212,066. Where the albedo or pectin bearing portion of the peel is not utilized the entire peel may be processed. In any event, the material to be processed is ground, pressed, and washed to remove the major part of the oil and peel constituents in the form of an emulsion. This emulsion is then strained and centrifuged to provide the commercial cold-pressed citrus oil. The best regulated processes result in substantial losses of oil during the straining and centrifuging operations.

The major difficulty encountered in carrying out the procedure of the prior art has been the inability to efficiently separate the complex emulsion of water and peel constituents formed during the grinding, pressing and washing operations. This emulsion consists of oil, pectin, pigments, sugars, cellulose, and other peel solids together with a large amount of water. Because of its complex physical and chemical nature, it is extremely difficult to separate even by centrifugation, and several stages are required in order to obtain a commercially acceptable yield.

A more detailed description of the process follows: The flavedo is finely ground, usually in the presence of water, by passing it through a device similar to the conventional meat grinder. After grinding, it is passed to a horizontally revolving reel, for example, one which is about 8 feet long and 18 inches in diameter and fabricated of stainless steel screen of about 45 mesh, where it is countercurrently washed with additional water. The washings from the reel contain the citrus oil, pectin, pigments, sugars, cellulose and other peel solids. The relatively dilute washings collected beneath that portion of the reel length nearer the water inlet are recycled and employed in flushing the ground flavedo from the grinder. The relatively concentrated washings obtained from that portion of the reel nearer the ground flavedo inlet are passed to a centrifuge, one of a disc-bowl type with a nozzle discharge for handling solids being suitable. Such a centrifuge is described in G. G. Brown et al., "Unit Operations," John Wiley & Sons, Inc., New York, 1950, on page 265. This centrifuge removes the larger particles of peel solids entrapped in the emulsion, together with water, the solids being discarded and the concentrated emulsion being passed to a holding tank.

From the reel the ground and washed flavedo which remains may be passed to a screw press to remove any residual emulsion remaining after washing and the press cake is discarded. The liquid obtained by pressing is relatively dilute with respect to its citrus oil content and is preferably combined with the dilute wash water from the reel and recycled.

From the holding tank the clarified emulsion is passed to a tubular bowl type of continuous super centrifuge adjusted to separate the oil from the other constituents of the emulsion, a suitable type of this device being described on page 264 of the aforementioned book by Brown et al. This centrifuge provides a pure citrus oil stream and a stream of water containing the pectin, pigments, sugars, cellulose and other peel constituents.

Other mechanical means of separating the citrus oil from the emulsion include filtration, sedimentation, settling followed by decantation or skimming, and the like. Although centrifuging is preferred such other methods of mechanical separation may be employed in practicing the process of the present invention.

It has now been found that addition of a surface active agent selected from the group consisting of alkyl aryl sulfonates and alkyl alkali metal sulfosuccinates to the water employed in this process greatly facilitates the subsequent separation of the oil and substantially increases the yield of oil obtainable. Such addition may be at any one or all of several different points in the process. For example, it may be added to the fresh water which is introduced into the reel, to the relatively dilute washings used to facilitate removal of the flavedo from the grinder, to the relatively concentrated washings which are sent to the disc-bowl type of centrifuge and/or to the holding tank in which the concentrated emulsion is held between the disc-bowl and tubular bowl centrifugations. It is preferred that the surface active agent or agents be added at the latter point, namely, to the concentrated emulsion contained in the holding tank, using an agitator to insure thorough distribution.

Examples of suitable alkyl aryl sulfonates and alkyl alkali metal sulfosuccinates that may be employed in accordance with the present invention are as follows:

Monobutyl diphenyl sodium monosulfonate
Sodium tetrahydronaphthalene sulfonate
Triethanolamine butyl naphthalene sulfonate
Sodium polyalkyl naphthalene sulfonate
Sodium propyl naphthalene sulfonate
Sodium isopropyl naphthalene sulfonate
Sodium diisopropyl naphthalene sulfonate
Sodium butyl naphthalene sulfonate
Sodium isobutyl naphthalene sulfonate
Sodium dibutyl naphthalene sulfonate
Sodium polybutyl naphthalene sulfonate
Sodium butyl propyl naphthalene sulfonate
Sodium octyl naphthalene sulfonate
Sodium benzyl naphthalene sulfonate
Polyalkyl benzene sulfonate in which the alkyl group has 12–18 carbon atoms
Sodium dodecyl benzene sulfonate
Sodium decyl benzene sulfonate
Diamyl sodium sulfosuccinate
Dibutyl sodium sulfosuccinate
Dihexyl sodium sulfosuccinate
Monolauryl sodium sulfosuccinate
Monooleyl sodium sulfosuccinate
Dioctyl sodium sulfosuccinate
Diamyl potassium sulfosuccinate
Dihexyl potassium sulfosuccinate Lauryl potassium sulfosuccinate
Oleyl potassium sulfosuccinate Of the various alkyl aryl sulfonates available commercially the product marketed under the trade name of "Nacconol NR" is preferred. Other commercially available alkyl aryl sulfonates include products marketed under the trade names of "Santomerse," "Aerosol OS," "Ultrawet," and other "Nacconols." A great variety of the sulfosuccinates for use in the present invention are marketed under the trade name of "Aerosol."

The alkyl aryl sulfonate and the alkyl alkali metal sulfosuccinate surface active agents may be employed in any suitable concentration, most of them being quite soluble in water, optimum concentrations with respect to the emulsion and/or the oil content thereof being readily determined. In the case of "Nacconol NR" it is preferred to employ 1 part by weight of the "Nacconol" to 10 parts by weight of the citrus oil. Generally, the orange oil ranges in concentration from 6% to 19% of the concentrated emulsion, the average being about 10%. In the case of lemon oil the range is from 2% to 11%, with an average of about 5%. Therefore, a "Nacconol NR" solution containing 5% by weight of the "Nacconol" is blended with the concentrated emulsion in the ratio of 1 volume of "Nacconol NR" solution with 4 volumes of orange oil emulsion and with 9 volumes of lemon oil emulsion.

While the present invention has been described with particular reference to specific embodiments it is not to be construed as limited thereby but reference is to be had to the appended claims for a definition of the scope of the invention.

What is claimed is:

1. In a process of recovering citrus oils from the aqueous emulsion resulting from the pressing and washing of citrus peel material, the improvement which comprises adding a surface active agent selected from the group consisting of an alkyl aryl sulfonate and an alkyl alkali metal sulfosuccinate to the emulsion prior to separating the citrus oil by mechanical means.

2. In a process of recovering citrus oils from the aqueous emulsion resulting from the pressing and washing of citrus peel material, the improvement which comprises adding an alkyl alkali metal sulfosuccinate surface active agent to the emulsion prior to separating the citrus oil by mechanical means.

3. In a process of recovering citrus oils from the aqueous emulsion resulting from the pressing and washing of citrus peel material, the improvement which comprises adding an alkyl aryl sulfonate surface active agent to the emulsion prior to separating the citrus oil by mechanical means.

4. In a process of recovering citrus oils from the aqueous emulsion resulting from the pressing and washing of citrus peel material, the improvement which comprises adding an alkyl aryl sulfonate surface active agent to the emulsion prior to separating the citrus oil by centrifugation.

5. The process of claim 4 in which the alkyl aryl sulfonate surface active agent is incorporated into the clarified citrus oil emulsion just prior to the separation of the oil by centrifugation.

6. The process of claim 4 in which the alkyl aryl sulfonate surface active agent is employed in the ratio of about 1 part by weight to about 10 parts by weight of the oil.

References Cited in the file of this patent
UNITED STATES PATENTS

| Number | Name | Date |
|---|---|---|
| 2,244,512 | Brandt | June 3, 1941 |
| 2,249,757 | Flett | July 22, 1941 |
| 2,381,732 | Finley | Aug. 7, 1945 |
| 2,415,600 | Meakin | Feb. 11, 1947 |
| 2,507,030 | Lynch | May 9, 1950 |